May 1, 1928.

L. R. SHOPE

SAMPLE DISPLAY DEVICE

Filed May 18, 1926

Inventor
Leslie R. Shope,
By Low & Low
Attorney

May 1, 1928.
L. R. SHOPE
1,668,428
SAMPLE DISPLAY DEVICE
Filed May 18, 1926
2 Sheets-Sheet 2
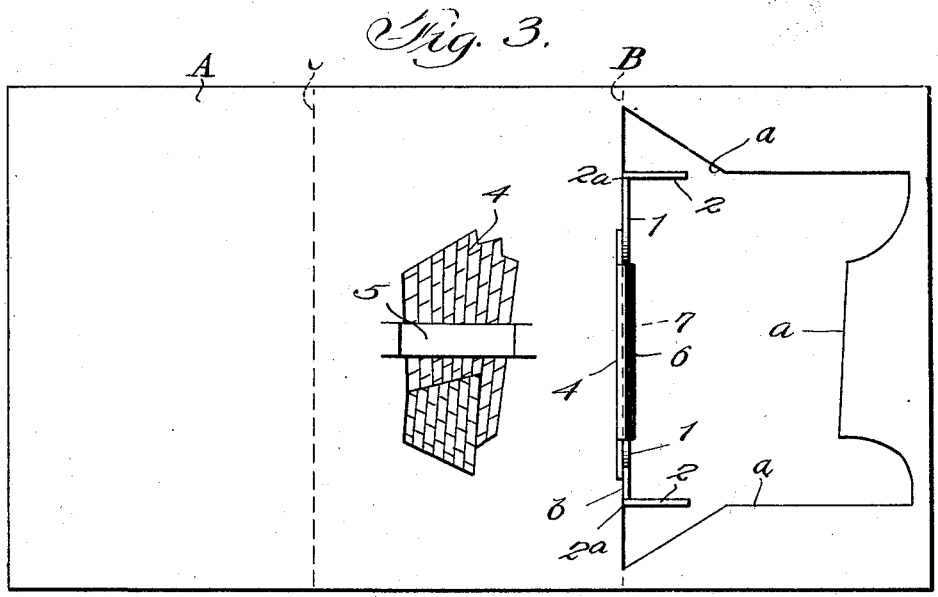
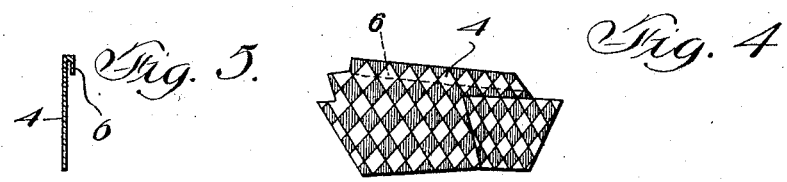
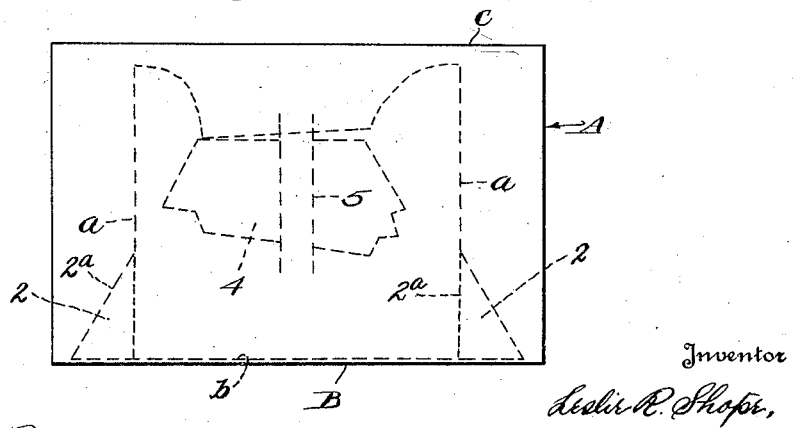
Inventor
Leslie R. Shope,
By Low & Low
Attorney Patented May 1, 1928.

1,668,428

UNITED STATES PATENT OFFICE.

LESLIE R. SHOPE, OF JACKSON HEIGHTS, NEW YORK, ASSIGNOR TO THE STUBBS COMPANY, OF DETROIT, MICHIGAN, A CORPORATION OF MICHIGAN.

SAMPLE DISPLAY DEVICE.

Application filed May 18, 1926. Serial No. 109,996.

The invention relates to sample display devices and relates more particularly to a roofing visualizer which may be used with advantageous results for advertising purposes.

An important object of the invention is to provide a sample display device which may be readily and conveniently adjusted and operated to visually indicate in miniature the appearance and effects of various types and colors of roofing in contrast with and to the actual building structure to which actual embodiments of the roof are designed to be applied.

A further object of the invention is to provide a sample display device which is pleasing in appearance, economical in manufacture, and which constitutes a valuable adjunct to the distributor in displaying and marketing the color and character of various roofs, each in itself attachable to various building structures. The device when operated by a prospective purchaser of the roof, affords in miniature an effect which is pleasing to the eye and which furthermore readily and accurately informs the user just what effect would be obtained by the use of various types and colors of roof in contrast to various types and styles of building architecture.

The device is particularly adapted and designed to be distributed among prospective purchasers to enable them to conveniently select not only the type of roof, such for example as slate, shingle or tile, which is best adapted for a particular need, but also enables such prospective purchaser to visually and readily determine in miniature the different color effects which might be obtained by the application of various shades of the roof to life-size building structures. In this manner a prospective purchaser may determine with a minimum of effort and without expense just what character and color of roof is adaptable for his particular needs. The device is further of utility as being simple in construction, pleasing in appearance and attractive in its nature and design.

With such objects in view, as well as other advantages which may be incident to the use of the improvements, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 3 is a plan view of the same.

Fig. 4 is a detail view of another style and color of miniature roof shaped to conform with the particular architectural design illustrated in Fig. 1.

Fig. 5 is a vertical sectional view on line 5—5 of Fig. 4.

Fig. 6 is a plan view of the device when in folded position.

Figure 1:
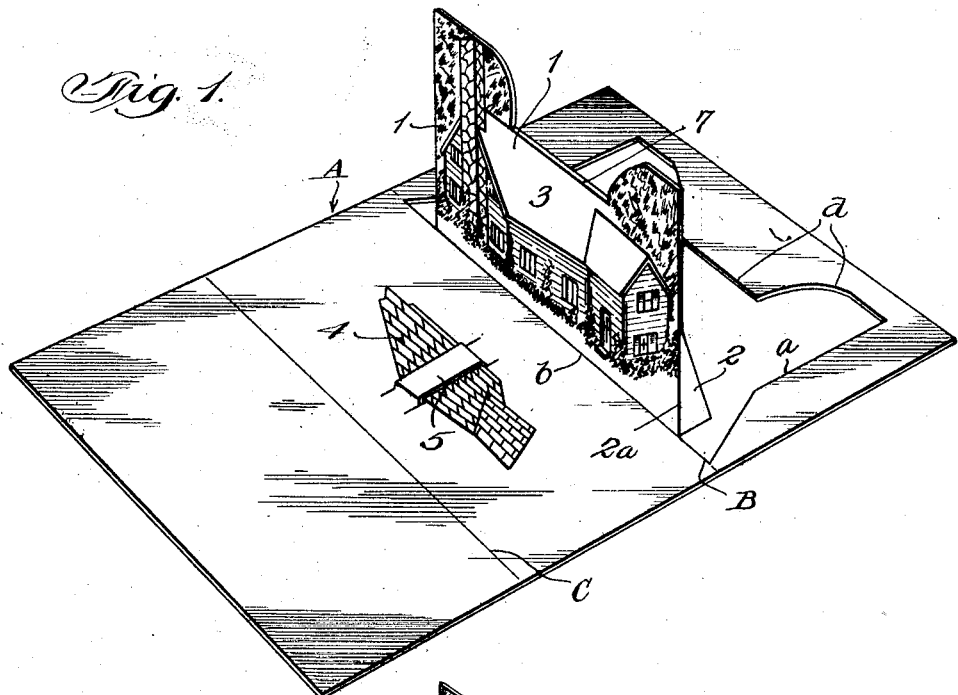
Fig. 1 is a perspective view of a preferred embodiment of the roofing visualizer in open and adjusted position in readiness to have a selected roof applied thereto, such roof being a miniature embodiment of any one of a varied selection of roofs with regard to color and material.

Referring to the drawings, in the embodiment illustrated the roofing display device or visualizer is preferably formed of cardboard or relatively stiff paper designed to be folded upon itself to provide a self-contained unit of convenient size for mailing or distribution to prospective customers. The material of which the device is constituted is indicated at A and is designed to be folded upon itself along the lines B and C. A visual miniature representation 1 of any desired and accepted building structure is embodied in the device and is designed to be cut out along the marginal lines $a$ and folded up by the customer along the dotted or scored line $b$. Projecting wings or flaps 2 are designed to be folded upon the scored lines $2^a$ to support the building structure 1 in vertical position as illustrated in Fig. 1 of the drawing.

The building structure 1 is of an accepted architectural style and is suitably tinted or colored to present a neutral effect designed to harmonize with the styles and colors of various miniature roof elements or masks adapted to be selectively applied to the building. The houses or buildings 1 are or may be of various forms and styles of architecture, one form being embodied in each device. An accepted style is illustrated herein to lend to a clear understanding of the invention. The design and color of the building are preferably illustrated clearly and more or less in detail and with exactitude in order to visually present a pleasing effect. 3 indicates the roof area which is visible in the perspective afforded by the nature of the building structure illustrated on the portion 1 of a display device, and this area 3 may be left blank for the purposes of the present invention.

Figure 2:
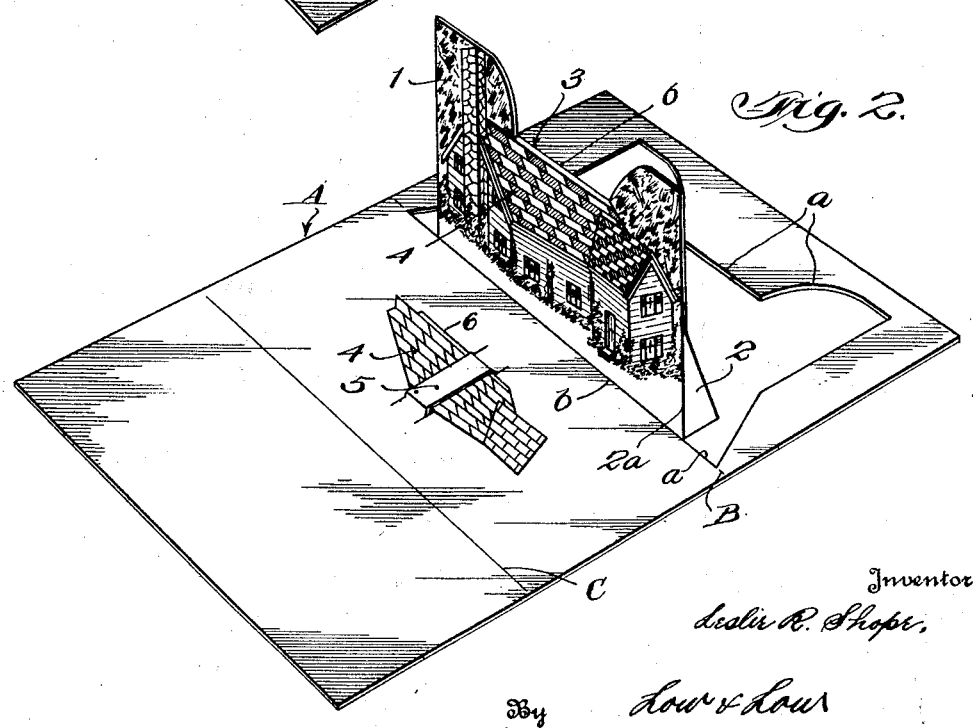
Fig. 2 is a similar view of the device showing a selected roof applied thereto.

The assortment of roof elements or masks is indicated at 4 and for convenience may be contained beneath a retaining band 5 which may be separate from or, as illustrated, constituting an integral cut away portion of the material A. Each roof mask 4 is shaped to conform with the roof area 3, disclosed in the miniature perspective of the building illustrated in Fig. 1. The roof element or mask 4 is preferably constructed of the same material as the body of the device and is or may be formed at its upper edge with an integral down-turned flap or flange 6 which permits any desired mask to be readily and accurately placed upon and maintained in position on the body 1 of the device, as best illustrated in Fig. 2. In this manner the downturned edge 6 of the roof mask may be positioned over the ridge 7 of the building structure on the portion 1 of the device. The roof mask will be understood as being provided with the device in a number of styles and colors, but of the same configuration to enable the same to be selectively positioned on the building 1 to visually obtain the effect and contrast of various colors and styles of roofs with the particular style of architecture illustrated on the cut-out portion 1 of the device. For example, in the embodiment illustrated, the mask 4 in position in Fig. 2 shows in miniature a roof which may be formed of shingles, and the color of the same is such as to harmonize with the various colors and architecture of the building. In Fig. 4 there is illustrated another style of roof, for example, shingle or tile, which may be positioned on the ridge 7 to visually give the effect in perspective of such alternate style and color of roof in combination with the building illustrated. Any desired number of roof elements or masks may be provided as an incident to the display device, such roof elements illustrating the various styles manufactured by the distributor of the device. It will be further understood that various building configurations 1 may be provided, each having graphically displayed thereon well known and accepted architectural designs which are generally used. In this manner a prospective customer is enabled, by convenient manipulation of the device, to accurately determine the effect of various types and classes of roofs in combination with a particular style of building architecture in which he is interested.

In distributing the device the various assortment of roofing elements and building structures may be assembled as illustrated in Fig. 6 or the same may be packed separately in flat and superposed relation, thereby occupying a minimum of space. The device is of an appealing nature to prospective customers who are thereby enabled to determine the style and character of roof which is best suited for their particular needs.

What I claim is:—

A roofing visualizer comprising a blank sheet adapted to be folded upon itself to constitute a folder, said sheet having a cut-out portion having the configuration and colored design of a building structure adapted to be adjusted to upright position when the folder is extended, side wings on said cut out portion for maintaining the building structure in an upright position, and a plurality of roof masks removably contained by said blank sheet and having downturned flange portions cooperating with the ridge portion of said building structure, said roof masks being of different colors and designs to harmonize with said building structure, whereby said mask may be selectively positioned on the building and maintained in position by said flange portion, to present a variety of contrasts as to the color and style of such masks in comparison to the color and style of said building structure.

In testimony whereof I affix my signature.

LESLIE R. SHOPE.